United States Patent
Jin et al.

(10) Patent No.: US 11,725,149 B1
(45) Date of Patent: Aug. 15, 2023

(54) FLUIDIZED CATALYTIC CRACKING PROCESSES AND ADDITIVES FOR IMPROVING GASOLINE YIELD AND QUALITY

(71) Applicants: Saudi Arabian Oil Company, Dhahran (SA); King Fahd University of Petroleum and Minerals, Dhahran (SA)

(72) Inventors: Yaming Jin, Dhahran (SA); Omer Refa Koseoglu, Dhahran (SA); Abdullah M. Aitani, Khobar (SA); Ziyauddin S. Qureshi, Dhahran (SA); M. Abdullbari Siddiqui, Dhahran (SA)

(73) Assignees: Saudi Arabian Oil Company, Dhahran (SA); King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 17/838,614

(22) Filed: Jun. 13, 2022

(51) Int. Cl.
*C10G 11/18* (2006.01)
*B01J 29/80* (2006.01)
(Continued)

(52) U.S. Cl.
CPC ............ *C10G 11/18* (2013.01); *B01J 29/084* (2013.01); *B01J 29/405* (2013.01); *B01J 29/80* (2013.01);
(Continued)

(58) Field of Classification Search
CPC .... C10G 11/18; C10G 11/05; C10G 2300/70; C10G 2400/02; B01J 29/084; B01J 29/405; B01J 29/80; B01J 2029/062
See application file for complete search history.

(56) References Cited

U.S. PATENT DOCUMENTS

| 4,210,560 A | 7/1980 | Kehl |
| 4,255,288 A | 3/1981 | Cull et al. |

(Continued)

FOREIGN PATENT DOCUMENTS

| CN | 101134576 A | 3/2008 |
| CN | 101262945 A | 9/2008 |

(Continued)

OTHER PUBLICATIONS

Search Report and Written Opinion dated Aug. 21, 2015 pertaining to International Application No. PCT/US2015/032129 filed May 22, 2015, 14 pgs.

(Continued)

*Primary Examiner* — Ellen M McAvoy
*Assistant Examiner* — Chantel L Graham
(74) *Attorney, Agent, or Firm* — Dinsmore & Shohl LLP

(57) ABSTRACT

A fluid catalytic cracking catalyst composition (FCC catalyst composition) includes an FCC catalyst and from 1 wt.% to 30 wt.% aromatization-promoting FCC additive. The FCC catalyst includes a USY zeolite, and the aromatization-promoting FCC additive is an MFI zeolite modified with an aromatization compound. The aromatization compound is a metal or metal oxide that includes a metal element from periods 4-6 of the IUPAC periodic table. A method for upgrading a hydrocarbon feed includes contacting the hydrocarbon feed with the FCC catalyst composition at reaction conditions sufficient to upgrade at least a portion of the hydrocarbon feed.

18 Claims, 3 Drawing Sheets

(51) Int. Cl.
*C10G 11/05* (2006.01)
*B01J 29/08* (2006.01)
*B01J 29/40* (2006.01)
*B01J 29/06* (2006.01)

(52) U.S. Cl.
CPC .......... *C10G 11/05* (2013.01); *B01J 2029/062* (2013.01); *C10G 2300/70* (2013.01); *C10G 2400/02* (2013.01)

(56) References Cited

U.S. PATENT DOCUMENTS

| | | |
|---|---|---|
| 4,437,978 A | 3/1984 | Chester et al. |
| 4,826,586 A | 5/1989 | Herbst et al. |
| 4,855,036 A | 8/1989 | Chiang et al. |
| 5,308,813 A | 5/1994 | Vaughan et al. |
| 5,411,724 A | 5/1995 | Beyer et al. |
| 6,069,012 A | 5/2000 | Kayser |
| 6,132,594 A | 10/2000 | Okazaki et al. |
| 6,267,873 B1 | 7/2001 | Das et al. |
| 6,346,224 B1 | 2/2002 | Vitale-Rojas et al. |
| 6,358,486 B1 | 3/2002 | Shan et al. |
| 6,482,313 B1 | 11/2002 | Schuette et al. |
| 6,635,168 B2 | 10/2003 | Zhao et al. |
| 6,726,834 B2 | 4/2004 | Quesada et al. |
| 6,762,143 B2 | 7/2004 | Shan et al. |
| 6,884,744 B2 | 4/2005 | Cheng et al. |
| 7,084,087 B2 | 8/2006 | Shan et al. |
| 7,550,405 B2 | 6/2009 | Shan et al. |
| 8,002,970 B2 | 8/2011 | Euzen et al. |
| 8,535,632 B2 | 9/2013 | Chase et al. |
| 9,221,036 B2 | 12/2015 | Koseoglu et al. |
| 10,081,009 B2 | 9/2018 | Koseoglu et al. |
| 10,357,761 B2 | 7/2019 | Koseoglu et al. |
| 2002/0179492 A1 | 12/2002 | Zhao et al. |
| 2003/0006168 A1 | 1/2003 | Ino et al. |
| 2003/0013601 A1 | 1/2003 | Cheng et al. |
| 2008/0308456 A1 | 12/2008 | Stamires et al. |
| 2009/0216058 A1* | 8/2009 | Dath ................ B01J 29/80 502/67 |
| 2009/0283443 A1 | 11/2009 | Kuroda et al. |
| 2011/0052467 A1 | 3/2011 | Chase et al. |
| 2011/0251049 A1 | 10/2011 | Kuroda et al. |
| 2013/0175202 A1 | 7/2013 | Koseoglu et al. |
| 2015/0111721 A1 | 4/2015 | Tian et al. |
| 2015/0111722 A1 | 4/2015 | Long et al. |
| 2015/0375218 A1 | 12/2015 | Koseoglu et al. |
| 2022/0001362 A1 | 1/2022 | Koseoglu et al. |
| 2022/0023844 A1* | 1/2022 | Digne ................ B01J 29/80 |

FOREIGN PATENT DOCUMENTS

| | | |
|---|---|---|
| CN | 101898144 A | 12/2010 |
| JP | H07308581 A | 11/1995 |
| WO | 2011115785 A1 | 9/2011 |
| WO | 2013057319 A2 | 4/2013 |
| WO | 2013123299 A1 | 8/2013 |
| WO | 2015179735 A1 | 11/2015 |
| WO | 2019147465 A1 | 8/2019 |
| WO | 2021086632 A1 | 5/2021 |

OTHER PUBLICATIONS

Wang et al. "Characterization of titanium-modified USY zeolites and their catalytic performance on n-heptane cracking" Applied Catalysis A: General 214 (2001) 167-177, 11 pgs.

ASTM International "Standard Test Method for Testing Fluid Catalytic Cracking (FCC) Catalysts by Microactivity Test", Designation: D3907/D3907M-19, Apr. 1, 2019.

ASTM International "Standard Test Method for Determining Activity and Selectivity of Fluid Catalytic Cracking (FCC) Catalysts by Microactivity Test", Designation: D5154/D5154M-18, May 1, 2018.

Bradley et al., "Characterization and Catalyst Development", ACS Symposium Series: American Chemical Society, Washington, DC 1989.

Search Report and Written Opinion dated Jun. 22, 2021 pertaining to International Application No. PCT/US2021/024620 filed Mar. 29, 2021, 12 pgs.

* cited by examiner

FLUIDIZED CATALYTIC CRACKING PROCESSES AND ADDITIVES FOR IMPROVING GASOLINE YIELD AND QUALITY

BACKGROUND

Field

The present disclosure generally relates to processes for upgrading hydrocarbons, more specifically, to FCC catalyst compositions and fluidized catalytic cracking processes for upgrading hydrocarbons using the FCC catalyst compositions.

Technical Background

Petrochemical feeds, such as crude oils, can be converted to chemical products and intermediates such as gasoline, olefins, aromatic compounds, liquid petroleum gases, cracked gas oil, and other compounds, which are basic intermediates for a large portion of the petrochemical industry. The worldwide increasing demand for light olefins and aromatic compounds remains a major challenge for many integrated refineries. In particular, the production of some valuable light olefins, such as ethylene, propene, and butenes, has attracted increased attention as pure olefin streams are considered the building blocks for polymer synthesis. Additionally, aromatic compounds such as benzene, toluene, ethylbenzene, and xylenes can be valuable intermediates for synthesizing polymers and other organic compounds as well as for fuel additives.

SUMMARY

The fluidized catalytic cracking (FCC) unit is one of the primary hydrocarbon conversion units in the modern petroleum refinery. In FCC processes, hydrocarbons are catalytically cracked with an acidic catalyst maintained in a fluidized state. The catalyst may be regenerated on a continuous basis. One of the main products from such processes has typically been gasoline. Other products can also be produced in lesser quantities, such as liquid petroleum gas and cracked gas oil. Some of the hydrocarbons from the feed can be further upgraded to light olefins, such as ethylene, propylene, mixed butenes, or combinations of these, during the FCC process. Coke deposited on the catalyst is burned off at high temperatures and in the presence of air prior to recycling regenerated catalyst back to the reaction zone. Despite the many advances in FCC processes, the industry is constantly seeking improved catalyst materials, particularly those capable of increasing conversion to the desired products.

In FCC processes, additives can be included in the FCC catalyst inventory to improve process operation, modify the product yields, modify the characteristics or properties of the products, or combinations of these. FCC catalysts can include MFI zeolite-based FCC additives that can be used either to enhance light olefins yield in integral FCC units or to improve FCC gasoline octane in gasoline focused FCC units. Under the light olefins producing operation mode, gasoline range olefins are cracked on the MFI zeolite-based additive to form light olefins having less than or equal to 6 carbon atoms. As a result, the greater yield of light olefin compounds is often accompanied by decreased gasoline yield and quality. Accordingly, there is an ongoing need for fluidized catalytic cracking catalyst compositions and methods of upgrading hydrocarbons that result in acceptable yields of light olefin compounds while at the same time increasing the yield and quality of gasoline components.

MFI zeolite based additives can also catalyze the other secondary chemical reactions in FCC process such as olefins isomerization, olefin aromatization, and light olefins oligomerization, which can lead to improved FCC gasoline octane and higher gasoline yield. The present disclosure is directed to fluidized catalytic cracking (FCC) catalyst compositions that are capable of producing a balanced yield structure between light olefin compounds and gasoline components while at the same time increasing the quality of gasoline components. The FCC catalyst compositions of the present disclosure includes an FCC catalyst, such as an ultra-stable Y-type zeolite (USY zeolite), and an aromatization-promoting FCC additive. The aromatization-promoting FCC additive comprises an MFI zeolite modified by an aromatization compound, where the aromatization compound comprises a metal or metal oxide having metal elements from periods 4-6 of the IUPAC periodic table. The FCC catalyst composition of the present disclosure can produce acceptable yields of light olefins, while the aromatization-promoting FCC additive can catalyze secondary chemical reactions in the FCC reactor to increase the quality and yield of gasoline constituents produced in the FCC system.

According to one or more aspects of the present disclosure, a method for upgrading a hydrocarbon feed can comprise contacting the hydrocarbon feed with an FCC catalyst composition in a fluidized catalytic cracking reactor at reaction conditions to upgrade at least a portion of the hydrocarbon feed to produce gasoline and light olefins. The FCC catalyst composition can comprise an FCC catalyst and from 1 weight percent (wt.%) to 30 wt.% aromatization-promoting FCC additive based on the total weight of the FCC catalyst composition. The aromatization-promoting FCC additive can comprise an MFI zeolite modified by an aromatization compound. The aromatization compound can comprise a metal or metal oxide comprising one or more metal elements from periods 4-6 of the IUPAC periodic table. In embodiments, the FCC catalyst can comprise a USY zeolite.

According to one or more other aspects of the present disclosure, a fluid catalytic cracking (FCC) catalyst composition can comprise an FCC catalyst and from 1 weight percent (wt.%) to 30 wt.% aromatization-promoting FCC additive based on the total weight of the FCC catalyst composition. The aromatization-promoting FCC additive can comprise an MFI zeolite modified by an aromatization compound. The aromatization compound can comprise a metal or metal oxide comprising one or more metal elements from periods 4-6 of the IUPAC periodic table. In embodiments, the FCC catalyst can comprise a USY zeolite.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
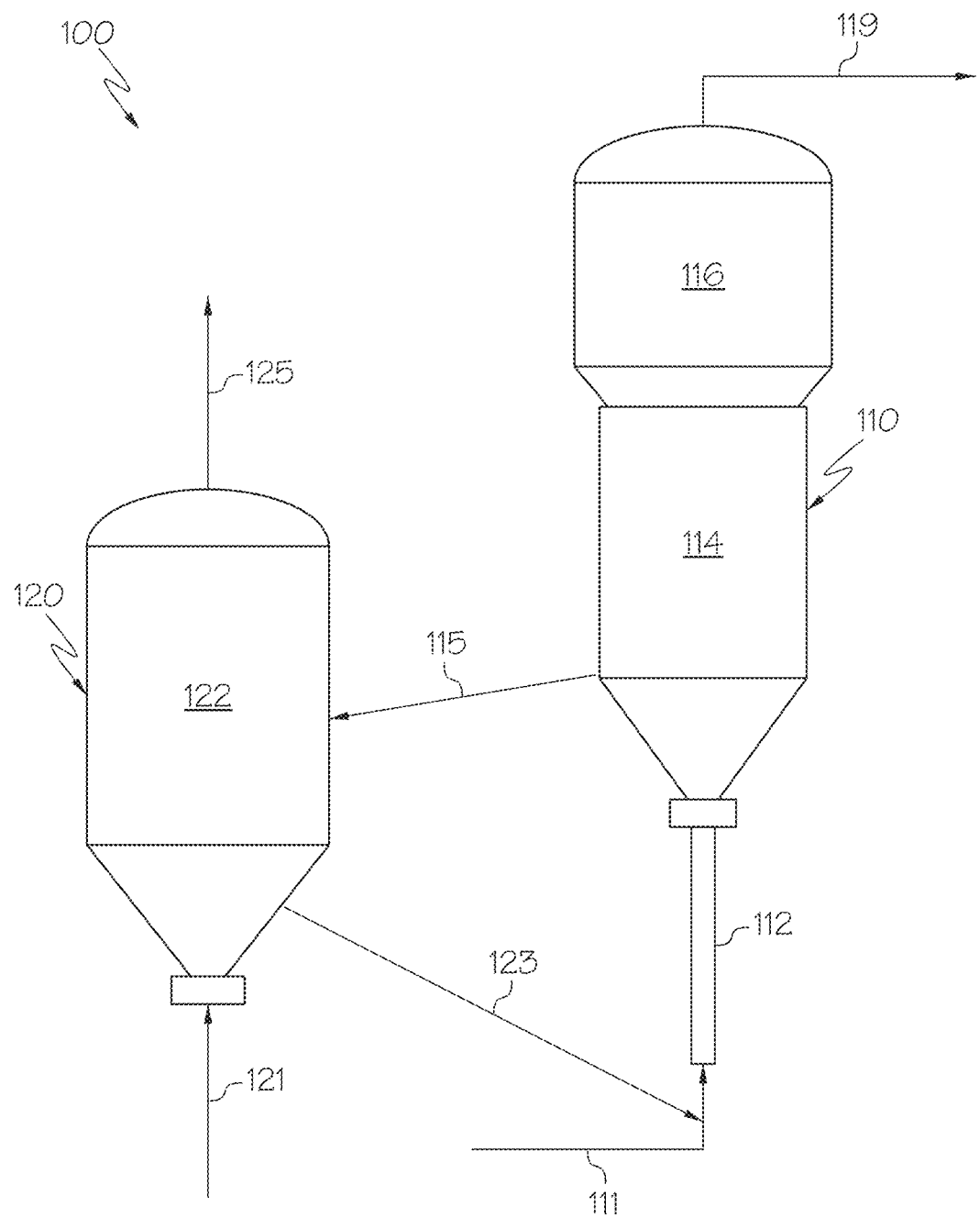
FIG. 1 schematically depicts a generalized flow diagram of a system for upgrading a hydrocarbon feed, according to one or more embodiments shown and described in this disclosure.
Figure 2:
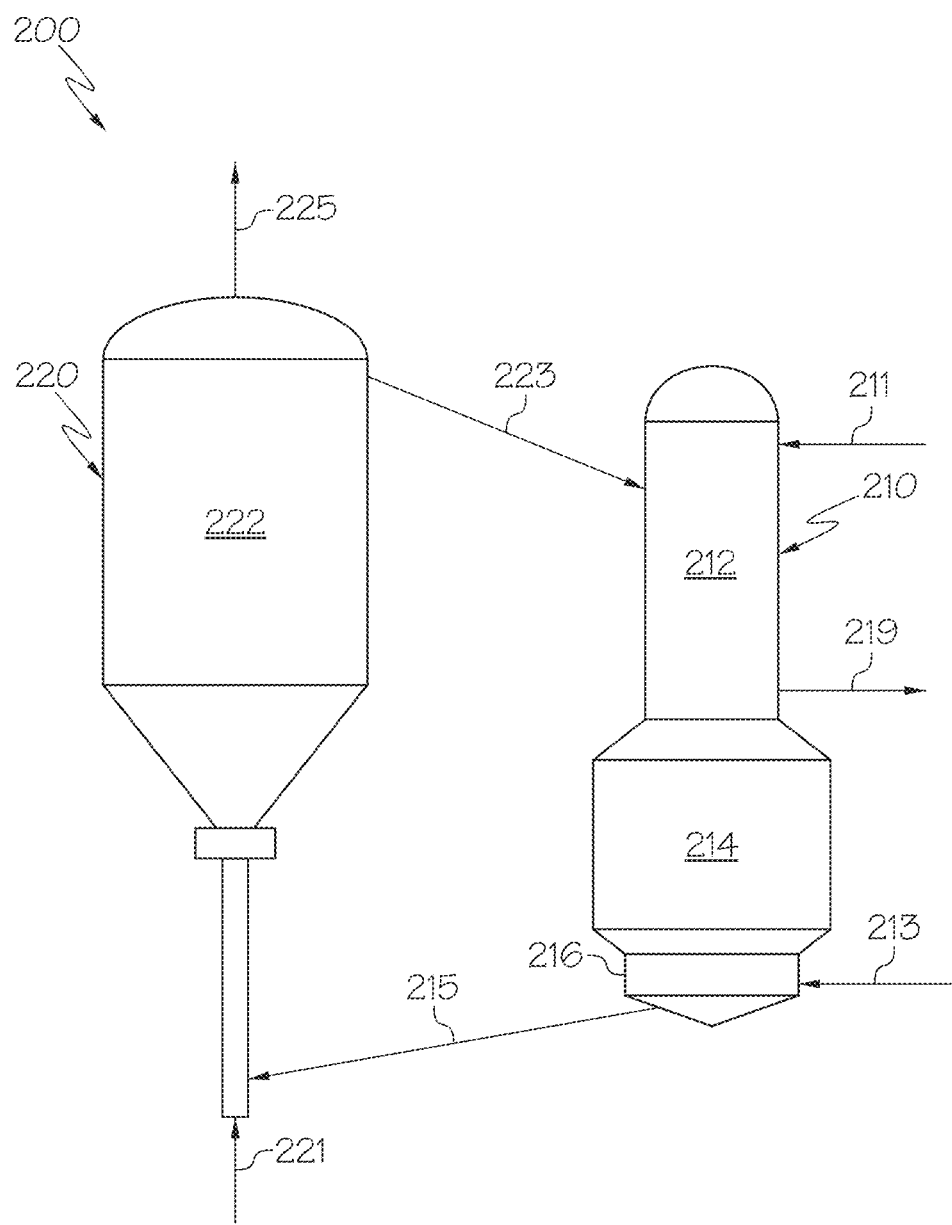
FIG. 2 schematically depicts a generalized flow diagram of another system for upgrading a hydrocarbon feed, according to one or more embodiments shown and described in this disclosure.

For the purpose of describing the simplified schematic illustrations and descriptions of FIGS. 1-2, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines, which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-2. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The present disclosure is directed to fluid catalytic cracking (FCC) catalyst compositions and methods of upgrading hydrocarbons through the cracking of a hydrocarbon feed using the FCC catalyst composition. In particular, the present disclosure is directed to an FCC catalyst composition comprising an FCC catalyst and an aromatization-promoting FCC cracking additive. In embodiments, the FCC catalyst can comprise an ultrastable Y-type zeolite (USY zeolite). The aromatization-promoting FCC cracking additive comprises an MFI-zeolite and an aromatization compound. The present disclosure is also directed to methods of upgrading a hydrocarbon feed using the FCC catalyst composition. The methods may comprise contacting the hydrocarbon feed with the FCC catalyst composition in a fluid catalytic cracking unit at reaction conditions sufficient to upgrade at least a portion of the hydrocarbon feed to produce one or more olefins and gasoline components.

The FCC catalyst compositions and methods of the present disclosure for upgrading hydrocarbons may improve the yield and quality of gasoline components while maintaining the yields of light olefins compared to conventional FCC catalysts and additives. The FCC catalyst compositions and methods of the present disclosure can further reduce dry gas yield from the FCC process.

As used in this disclosure, a "catalyst" refers to any substance that increases the rate of a specific chemical reaction. Catalysts and catalyst components described in this disclosure may be utilized to promote various reactions, such as, but not limited to cracking, aromatic cracking, olefins isomerization, olefin aromatization, light olefins oligomerization, or combinations of these.

As used in this disclosure, "cracking" refers to a chemical reaction where a molecule having carbon-carbon bonds is broken into more than one molecule by the breaking of one or more of the carbon-carbon bonds, such as paraffinic or naphthenic bonds or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used throughout the present disclosure, the term "light olefins" refers to one or more of ethylene, propylene, butenes, or combinations of these.

As used throughout the present disclosure, the terms "butene" and "butenes" refer to one or more than one isomer of butene, such as one or more of 1-butene, trans-2-butene, cis-2-butene, isobutene, or mixtures of these isomers. As used throughout the present disclosure, the term "normal butenes" refers to one or more than one of 1-butene, trans-2-butene, cis-2-butene, or mixtures of these isomers, and does not include isobutene. As used throughout the present disclosure, the term "2-butene" refers to trans-2-butene, cis-2-butene, or a mixture of these two isomers.

As used throughout the present disclosure, the term "crude oil" or "whole crude oil" refers to crude oil received directly from an oil field or from a desalting unit without having any fraction separated by distillation.

As used throughout the present disclosure, the terms "gasoline fraction" and "gasoline constituents" refer to the collective constituents of a hydrocarbon stream, such as but not limited to the cracking effluent, having atmospheric boiling point temperatures in the range of from $C_5$-221° C. It is noted that the boiling point of normal pentane (n-$C_5$) is about 36° C. It is noted that the gasoline constituents generally include light aromatic compounds, such as benzene, toluene, mixed zylenes, ethylbenzene and other light aromatic compounds having boiling point temperatures between $C_5$ and 220° C.

As used throughout the present disclosure, the terms "upstream" and "downstream" refers to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in this disclosure, the term "effluent" refers to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt.%), from 70 wt.%, from 90 wt.%, from 95 wt.%, from 99 wt.%, from 99.5 wt.%, or even from 99.9 wt.% of the contents of the stream to 100 wt.% of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

As previously discussed, the FCC catalyst compositions of the present disclosure can be an FCC catalyst blend comprising an FCC catalyst and an aromatization-promoting FCC additive. In embodiments, the FCC catalyst can include an ultrastable Y-type zeolite (USY-zeolite). The aromatization-promoting FCC additive includes an MFI-zeolite and an aromatization compound comprising a metal or metal oxide that includes a metal element from periods 4-6 of the International Union of Pure and Applied Chemistry (IUPAC) periodic table. In embodiments, the FCC catalyst composition can be a physical mixture of the FCC catalyst particles and the aromatization-promoting FCC additive. The FCC catalyst compositions of the present disclosure can be used in an FCC process for converting hydrocarbons to gasoline, olefins, or other valuable products and intermediates.

The FCC catalyst may be any cracking catalyst suitable for use in a fluidized catalytic cracking unit. The FCC catalyst may also be operable as a heat carrier and may provide heat transfer to the hydrocarbon feed in the FCC process. The FCC catalyst can have a plurality of catalytically active sites, such as acidic sites that promote the catalytic cracking of at least a portion of the hydrocarbon feed. Suitable FCC catalysts can include natural or synthetic zeolites, such as Y zeolites, REY zeolites, USY zeolites, RE-USY zeolites, or combinations of these; clays, such as kaolin, montmorilonite, halloysite, and bentonite; inorganic porous oxides, such as alumina, silica, boria, chromia, magnesia, zirconia, titania and silica-alumina; or combinations of these. In embodiments, the FCC catalyst comprises a USY zeolite.

The USY zeolite may be any type of USY zeolite. The USY zeolite can be a commercially-available USY zeolite or may be prepared from a Y zeolite according to known methods. One production method for the above USY zeolite can include subjecting a Y-type zeolite (Na-Y) synthesized by a common method to the exchange of sodium ions with ammonium ions by a conventional method. One such conventions method can include dispersing Y-type zeolite in water to prepare a suspension, adding ammonium sulfate to the suspension, washing the solid matter with water, washing the solid matter with ammonium sulfate aqueous solution at a temperature from 40° C. to 80° C., washing the solid matter with water at a temperature from 40° C. to 95° C., and drying the solid matter at a temperature from 100° C. to 180° C. for about 30 minutes. Accordingly, an ammonium-exchanged Y-type zeolite, $NH_4\text{-}^{50\ to\ 70}Y$, in which about 50 wt.% to 70 wt.% of Na contained in the Y-type zeolite is substituted with $NH_4$, is obtained.

Subsequently, a hydrogen form of Y-zeolite (HY) can be prepared by calcining the above ammonium-exchanged Y-type zeolite ($NH_4\text{-}^{50\ to\ 70}Y$) at from 500° C. to 800° C. for 10 minutes to 10 hours in, for example, a saturated vapor atmosphere. Then, an ammonium-exchanged Y-type zeolite ($NH_4\text{-}^{80\ to\ 97}Y$) in which about 80 wt.% to 97 wt.% of Na contained in the initial Y-type zeolite (Na-Y) is ion-exchanged with $NH_4$, is obtained. The hydrogen form of the Y-type zeolite obtained above can be dispersed in water at a temperature of 40° C. to 95° C. to prepare a suspension, and ammonium sulfate is added to the suspension. The suspension can then be stifled at a temperature of 40° C. to 95° C. for 10 minutes to 3 hours. Then, the solid matter can be washed with water at a temperature of 40° C. to 95° C., then with an ammonium sulfate aqueous solution at a temperature of at a temperature of 40° C. to 95° C., and subsequently with water at a temperature of 40° C. to 80° C. Then, the solid matter is dried at a temperature from 100° C. to 180° C. for about 30 minutes to 30 hours. In embodiments, the final ammonium ion exchange rate can be 90% or greater.

The ammonium-exchanged Y-type zeolite ($NH_4$-$^{80\ to\ 97}$Y) thus obtained can be calcined at 500° C. to 700° C. for 10 minutes to 10 hours in, for example, a saturated vapor atmosphere. Accordingly, a USY zeolite can be prepared having a crystal lattice constant of from 2.430 nanometers to 2.450 nanometers, a specific surface area of from 600 square meters per gram to 900 square meters per gram, and a molar ratio of $SiO_2$ to $Al_2O_3$ of from 5:1 to 100:1. In the method for producing the USY zeolite of the present disclosure, non-framework aluminum can be removed from the Y zeolite described above to obtain the USY zeolite having a crystal lattice constant of 2.430 nanometers to 2.450 nanometers. Non-framework aluminum can be removed by, for example, a method of dispersing the Y zeolite described above in water at temperatures of from 40° C. to 95° C. to prepare a suspension, adding sulfuric acid to the suspension, and stifling the suspension for 10 minutes to 3 hours, while maintaining the temperature at 40° C. to 95° C. to dissolve the non-framework aluminum. After dissolving the non-framework aluminum, the suspension can be filtered, and a residue on the filter can be washed with purified water at a temperature from 40° C. to 95° C. and dried at a temperature from 100° C. to 145° C., whereby a USY zeolite from which the non-framework aluminum is removed may be obtained.

In the method for producing the USY zeolite of the present disclosure, the USY zeolite can be calcined at a temperature from 500° C. to 700° C., such as from 550° C. to 650° C. The time duration of calcining is typically not critical so long as the targeted USY zeolite is obtained. In embodiments, the time duration of calcining can be from 30 minutes to 10 hours. In embodiments, the calcining atmosphere for calcining the USY zeolite is air.

The USY zeolite can have a crystal lattice constant from 2.430 nanometers (nm) to 2.450 nm, such as, from 2.432 nm to 2.434 nm, from 2.432 nm to 2.436 nm, from 2.432 nm to 2.438 nm, from 2.432 nm to 2.440 nm, from 2.432 nm to 2.442 nm, from 2.432 nm to 2.444 nm, from 2.432 nm to 2.446 nm, from 2.432 nm to 2.448 nm, from 2.434 nm to 2.436 nm, from 2.434 nm to 2.438 nm, from 2.434 nm to 2.440 nm, from 2.434 nm to 2.442 nm, from 2.434 nm to 2.444 nm, from 2.434 nm to 2.446 nm, from 2.434 nm to 2.448 nm, from 2.434 nm to 2.450 nm, from 2.436 nm to 2.438 nm, from 2.436 nm to 2.440 nm, from 2.436 nm to 2.442 nm, from 2.436 nm to 2.444 nm, from 2.436 nm to 2.446 nm, from 2.436 nm to 2.448 nm, from 2.436 nm to 2.450 nm, from 2.438 nm to 2.440 nm, from 2.438 nm to 2.442 nm, from 2.438 nm to 2.444 nm, from 2.438 nm to 2.446 nm, from 2.438 nm to 2.448 nm, from 2.438 nm to 2.450 nm, from 2.440 nm to 2.442 nm, from 2.440 nm to 2.444 nm, from 2.440 nm to 2.446 nm, from 2.440 nm to 2.448 nm, from 2.440 nm to 2.450 nm, from 2.442 nm to 2.444 nm, from 2.442 nm to 2.446 nm, from 2.442 nm to 2.448 nm, from 2.442 nm to 2.450 nm, from 2.444 nm to 2.446 nm, from 2.444 nm to 2.448 nm, from 2.444 nm to 2.450 nm, from 2.446 nm to 2.448 nm, from 2.446 nm to 2.450 nm, or from 2.448 nm to 2.450 nm. The crystal lattice constant is determined according to ASTM method D3942. A crystal lattice constant less than 2.430 nm may tend to reduce the activity of the FCC catalyst composition. Similarly, a crystal lattice constant greater than 2.450 nm may result in the breaking of the crystal structure of the USY zeolite during FCC reactions.

The USY zeolite can have a specific surface area from 600 square meters per gram to 900 square meters per gram, as determined by the Brunauer-Emmett-Teller (BET) method. For example, the USY zeolite can comprise a specific surface area from 600 $m^2/g$ to 875 $m^2/g$, from 600 $m^2/g$ to 850 $m^2/g$, from 600 $m^2/g$ to 825 $m^2/g$, from 600 $m^2/g$ to 800 $m^2/g$, from 600 $m^2/g$ to 775 $m^2/g$, from 600 $m^2/g$ to 750 $m^2/g$, from 600 $m^2/g$ to 725 $m^2/g$, from 600 $m^2/g$ to 700 $m^2/g$, from 600 $m^2/g$ to 675 $m^2/g$, from 600 $m^2/g$ to 650 $m^2/g$, from 600 $m^2/g$ to 625 $m^2/g$, from 625 $m^2/g$ to 900 $m^2/g$, from 650 $m^2/g$ to 900 $m^2/g$, from 675 $m^2/g$ to 900 $m^2/g$, from 700 $m^2/g$ to 900 $m^2/g$, from 725 $m^2/g$ to 900 $m^2/g$, from 750 $m^2/g$ to 900 $m^2/g$, from 775 $m^2/g$ to 900 $m^2/g$, from 800 $m^2/g$ to 900 $m^2/g$, from 825 $m^2/g$ to 900 $m^2/g$, from 850 $m^2/g$ to 900 $m^2/g$, or from 875 $m^2/g$ to 900 $m^2/g$. A specific surface area less than 600 $m^2/g$ may reduce the number of solid acid sites having effective catalytic activity during FCC reactions. Similarly, a specific surface area exceeding 900 $m^2/g$ may be impractical due to production limitations.

The USY zeolite can have a molar ratio of silica ($SiO_2$) to alumina ($Al_2O_3$) from 5:1 to 100:1. In embodiments, the USY zeolite can comprise a molar ratio of $SiO_2$ to $Al_2O_3$ from 10:1 to 100:1, from 20:1 to 100:1, from 30:1 to 100:1, from 40:1 to 100:1, from 50:1 to 100:1, from 60:1 to 100:1, from 70:1 to 100:1, from 80:1 to 100:1, from 90:1 to 100:1, from 5:1 to 90:1, from 5:1 to 80:1, from 5:1 to 70:1, from 5:1 to 60:1, from 5:1 to 50:1, from 5:1 to 40:1, from 5:1 to 30:1, from 5:1 to 20:1, from 5:1 to 10:1, from 10:1 to 95:1, from 15:1 to 90:1, from 20:1 to 85:1, or from 25:1 to 80:1. A molar ratio of $SiO_2$ to $Al_2O_3$ less than 5:1 may result in an ineffective pore volume. Not intending to be bound to any particular theory, it is believed that an ineffective pore volume may cause a reduction in activity in cracking. Similarly, a molar ratio of $SiO_2$ to $Al_2O_3$ greater than 100:1 may result in a reduced number of solid acid sites, which can cause a reduction in cracking activity.

The FCC catalyst composition can include from 5 wt.% to 70 wt.% USY zeolite based on the total weight of the FCC catalyst composition. In embodiments, the FCC catalyst composition of the present disclosure can include from 5 wt.% to 10 wt.%, from 5 wt.% to 15 wt.%, from 5 wt.% to 20 wt.%, from 5 wt.% to 25 wt.%, from 5 wt.% to 30 wt.%, from 5 wt.% to 35 wt.%, from 5 wt.% to 40 wt.%, from 5 wt.% to 45 wt.%, from 5 wt.% to 50 wt.%, from 5 wt.% to 55 wt.%, from 5 wt.% to 60 wt.%, from 10 wt.% to 15 wt.%, from 10 wt.% to 20 wt.%, from 10 wt.% to 25 wt.%, from 10 wt.% to 30 wt.%, from 10 wt.% to 35 wt.%, from 10 wt.% to 40 wt.%, from 10 wt.% to 45 wt.%, from 10 wt.% to 50 wt.%, from 10 wt.% to 55 wt.%, from 10 wt.% to 60 wt.%, from 10 wt.% to 70 wt.%, from 15 wt.% to 20 wt.%, from 15 wt.% to 25 wt.%, from 15 wt.% to 30 wt.%, from 15 wt.% to 35 wt.%, from 15 wt.% to 40 wt.%, from 15 wt.% to 45 wt.%, from 15 wt.% to 50 wt.%, from 15 wt.% to 55 wt.%, from 15 wt.% to 70 wt.%, from 20 wt.% to 25 wt.%, from 20 wt.% to 30 wt.%, from 20 wt.% to 35 wt.%, from 20 wt.% to 40 wt.%, from 20 wt.% to 45 wt.%, from 20 wt.% to 50 wt.%, from 20 wt.% to 55 wt.%, from 20 wt.% to 60 wt.%, from 20 wt.% to 70 wt.%, from 25 wt.% to 30 wt.%, from 25 wt.% to 35 wt.%, from 25 wt.% to 40 wt.%, from 25 wt.% to 45 wt.%, from 25 wt.% to 50 wt.%, from 25 wt.% to 55 wt.%, from 25 wt.% to 60 wt.%, from 25 wt.% to 70 wt.%, from 30 wt.% to 35 wt.%, from 30 wt.% to 40 wt.%, from 30 wt.% to 45 wt.%, from 30 wt.% to 50 wt.%, from 30 wt.% to 55 wt.%, from 30 wt.% to 60 wt.%, from 30 wt.% to 70 wt.%, from 40 wt.% to 45 wt.%, from 40 wt.% to 50 wt.%, from 40 wt.% to 55 wt.%, from 40 wt.% to 60 wt.%, from 40 wt.% to 70 wt.%, from 50 wt.% to 55 wt.%, from 50 wt.% to 60 wt.%, or from 50 wt.% to 70 wt.% USY zeolite based on the total weight of the FCC catalyst composition.

In embodiments, the FCC catalyst comprising the USY zeolite can be composite catalyst particles, where the USY zeolite and is present in each of the composite catalyst particles. The FCC catalyst can include one or more non-zeolitic inorganic binders, one or more non-zeolitic fillers, one or more matrix materials, or combinations of these.

In embodiments, the FCC catalyst particles comprising the USY zeolite can further include non-zeolitic inorganic materials, such as non-zeolitic inorganic binders or non-zeolitic fillers for example. The FCC catalyst composition can include from 15 wt.% to 60 wt.% non-zeolitic inorganic materials based on the total weight of the FCC catalyst composition. In embodiments, the FCC catalyst composition can comprise from 15 wt.% to 20 wt.%, from 15 wt.% to 30 wt.%, from 15 wt.% to 40 wt.%, from 15 wt.% to 50 wt.%, from 20 wt.% to 30 wt.%, from 20 wt.% to 40 wt.%, from 20 wt.% to 50 wt.%, from 20 wt.% to 60 wt.%, from 30 wt.% to 40 wt.%, from 30 wt.% to 50 wt.%, from 30 wt.% to 60 wt.%, from 40 wt.% to 50 wt.%, from 40 wt.% to 60 wt.%, or from 50 wt.% to 60 wt.% non-zeolitic inorganic materials based on the total weight of the FCC catalyst composition.

The non-zeolitic inorganic materials can be silica based or alumina based. Non-zeolitic inorganic fillers can include, but are not limited to, one or more of silica sol, water glass (sodium silicate), silicic acid liquid, basic aluminum chloride, aluminum biphosphate, alumina sol, activated alumina, porous silica, metal trapping agents, or combinations of these. In embodiments, the non-zeolitic inorganic filler can be a silica sol comprising $SiO_2$. The silica sol comprising $SiO_2$ at a concentration from 10 mass percent to 15 mass percent, based on the total mass of the silica sol, can be prepared by adding water glass comprising $SiO_2$ at a concentration ranging from 12 mass percent to 23 mass percent and sulfuric acid having a concentration ranging from 20 mass percent to 30 mass percent simultaneously and continuously. A solution obtained by dissolving one or more crystallite alumina, such as gibbsite, bayerrite, or boehmite in an acid solution may be used as the aluminum compound filler. Basic aluminum chloride can be expressed by Formula (1).

$$[Al_2(OH)_nCL_{6-n}]_m \quad (1)$$

(where, $0<n<6$ and $1<m<10$, and the symbol m represents a natural number).

Aluminum biphosphate, also referred to as aluminum dihydrogen phosphate or primary aluminum phosphate, is expressed by $Al(H_2PO_4)_3$. Alumina sol may be produced by, for example, pH adjustment of pseudoboehmite alumina with an acid. The non-zeolitic inorganic materials can include non-zeolitic inorganic oxides such as but not limited to activated alumina, porous silica, rare-earth metal oxides, or combinations of these. In embodiments, the FCC catalyst particles can include one or more metal trapping agents operable to capture contaminant metals from the hydrocarbon feed, such as for removing vanadium and/or nickel from crude oil. The metal trapping agents can be non-zeolite metal trapping agents or can include additional zeolites as metal trapping agents, where the zeolite-based metal trapping agents are different from the USY zeolite of the FCC catalyst and the MFI zeolite of the aromatization-promoting FCC additive.

The FCC catalyst particles can comprise one or more matrix materials. As used in this disclosure, "matrix materials" refers to a clay material such as kaolin, which are also non-zeolitic materials. Without being bound by theory, it is believed that the matrix materials of the FCC catalyst can serve both physical and catalytic functions. Physical functions include providing particle integrity and attrition resistance, acting as a heat transfer medium, and providing a porous structure to allow diffusion of hydrocarbons into and out of the FCC catalyst particles. The matrix can also affect catalyst selectivity, product quality, and resistance to poisons. In embodiments, the matrix material comprises kaolin. As used in this disclosure, "kaolin" refers to a clay material that has a relatively large amount (such as at least about 50 wt. %, at least 60 wt. %, at least 70 wt. %, at least 80 wt. %, at least 90 wt. %, or even at least 95 wt. %) of kaolinite, which can be represented by the chemical formula $Al_2Si_2O_5(OH)_4$. In additional embodiments, the matrix material may comprise other clay materials.

The FCC catalyst particles can include one or more matrix materials in an amount of from 30 wt. % to 60 wt. % based on the total weight of the FCC catalyst particles. In embodiments, the FCC catalyst particles can comprise from 30 wt. % to 55 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 40 wt. % to 60 wt. %, from 45 wt. % to 60 wt. %, from 50 wt. % to 60 wt. %, or from 55 wt. % to 60 wt. % matrix material based on the total weight of the FCC catalyst particles. In embodiments, the FCC catalyst particles can include any single disclosed matrix material in an amount of the disclosed weight percentage ranges. In embodiments, the FCC catalyst particles can include any two or more matrix materials in combination in an amount of the disclosed weight percentage ranges.

In addition to the USY zeolite, the FCC catalyst composition also includes the aromatization-promoting FCC additive. The aromatization-promoting FCC additive comprises a Mordenite Framework Inverted zeolite (MFI zeolite) and an aromatization compound. As used in this disclosure, "MFI zeolite" refers to zeolites consisting of silica and alumina and having an MFI-framework type according to the IUPAC zeolite nomenclature. In embodiments, the MFI zeolite can comprise a ZSM-5 zeolite. ZSM-5 refers to "Zeolite Socony Mobil-5" and is a pentasil family zeolite that can be represented by the chemical formula $Na_nAl_nSi_{96-n}O_{192}$, where $0<n<27$. In embodiments, the MFI zeolite can comprise a hydrogen form ZSM-5 zeolite.

The MFI zeolite can have a molar ratio of silica ($SiO_2$) to alumina ($Al_2O_3$) from 5:1 to 200:1. In embodiments, the MFI zeolite can comprise a molar ratio of $SiO_2$ to $Al_2O_3$ from 10:1 to 200:1, from 20:1 to 200:1, from 30:1 to 200:1, from 40:1 to 200:1, from 50:1 to 200:1, from 100:1 to 200:1, from 150:1 to 200:1, from 5:1 to 100:1, from 10:1 to 100:1, from 20:1 to 100:1, from 30:1 to 100:1, from 40:1 to 100:1, from 50:1 to 100:1, from 5:1 to 90:1, from 5:1 to 80:1, from 5:1 to 70:1, from 5:1 to 60:1, from 5:1 to 50:1, from 5:1 to 40:1, from 5:1 to 30:1, from 5:1 to 20:1, from 5:1 to 10:1, from 10:1 to 95:1, from 15:1 to 90:1, from 20:1 to 85:1, or from 25:1 to 80:1.

The aromatization-promoting FCC additive further includes the aromatization compound. The aromatization compound can include a metal or metal oxide comprising one or more metal elements from periods 4-6 of the IUPAC periodic table. In embodiments, the metal elements of the aromatization compound can be selected from the group consisting of gallium (Ga), zinc (Zn), chromium (Cr), manganese (Mn), platinum (Pt), iron (Fe), molybdenum (Mo), lanthanum (La), cerium (Ce), and combinations thereof. In embodiments, the aromatization compound can comprise a metal or metal oxide comprising one or more metal elements selected from Ga, Zn, Cr, Mn, Pt, Fe, Mo, La, Ce, or combination of these. In embodiments, the aromatization compound can comprises a metal or metal oxide comprising one or more metal elements selected from Ga, Zn, Cr, Mn, Pt, Fe, Mo, or combination of these. In embodiments, the aromatization compound can comprise gallium metal, gallium oxide, or a combination of both.

The aromatization-promoting FCC additive can include an amount of the aromatization compound sufficient to promote aromatization of hydrocarbons from a hydrocarbon feed during fluidized catalytic cracking to improve the quality and yield of gasoline blending constituents. In embodiments, the aromatization-promoting FCC additive can include from 0.1 wt.% to 10 wt.% aromatization compound based on the total weight of the aromatization-promoting FCC additive. In embodiments, the aromatization-promoting FCC additive can include from 0.1 wt.% to 9 wt.%, from 0.1 wt.% to 8 wt.%, from 0.1 wt.% to 7 wt.%, from 0.1 wt.% to 5 wt.%, from 0.5 wt.% to 10 wt.%, from 0.5 wt.% to 9 wt.%, from 0.5 wt.% to 8 wt.%, from 0.5 wt.% to 7 wt.%, from 0.5 wt.% to 5 wt.%, from 1 wt.% to 10 wt.%, from 1 wt.% to 9 wt.%, from 1 wt.% to 8 wt.%, from 1 wt.% to 7 wt.%, from 1 wt.% to 5 wt.%, from 2 wt.% to 10 wt.%, from 2 wt.% to 9 wt.%, from 2 wt.% to 8 wt.%, from 2 wt.% to 7 wt.%, from 2 wt.% to 5 wt.%, from 5 wt.% to 10 wt.%, from 5 wt.% to 9 wt.%, from 5 wt.% to 8 wt.%, or from 5 wt.% to 7 wt.% aromatization compound based on the total weight of the aromatization-promoting FCC additive.

The aromatization compound can be supported by the MFI zeolite. The aromatization compound can be disposed at the outer surfaces, at the pore surfaces, or both of the MRI zeolite so that the aromatization compound is accessible to reactants that contact the outer surfaces or pore surfaces of the aromatization-promoting FCC additive. In embodiments, the aromatization compound can be deposited on the outer surfaces and pore surfaces of the MFI zeolite so that the aromatization compound is accessible to reactants that come into contact with the aromatization-promoting FCC additive or diffuse into the pores of the aromatization-promoting FCC additive. The aromatization compound can be deposited on the MFI zeolite through known methods.

The FCC catalyst composition can include an amount of the aromatization-promoting FCC additive sufficient to promote aromatization of hydrocarbons from a hydrocarbon feed during fluidized catalytic cracking to improve the quality and yield of gasoline blending constituents. The FCC catalyst composition can include from 1 wt.% to 30 wt.% aromatization-promoting FCC additive based on the total weight of the FCC catalyst composition. In embodiments, the FCC catalyst composition can comprise from 1 wt.% to 5 wt.%, from 1 wt.% to 10 wt.%, from 1 wt.% to 15 wt.%, from 1 wt.% to 20 wt.%, from 1 wt.% to 25 wt.%, from 2 wt.% to 10 wt.%, from 2 wt.% to 15 wt.%, from 2 wt.% to 20 wt.%, from 2 wt.% to 25 wt.%, from 2 wt.% to 30 wt.%, from 5 wt.% to 10 wt.%, from 5 wt.% to 15 wt.%, from 5 wt.% to 20 wt.%, from 5 wt.% to 25 wt.%, from 5 wt.% to 30 wt.%, from 10 wt.% to 15 wt.%, from 10 wt.% to 20 wt.%, from 10 wt.% to 25 wt.%, from 10 wt.% to 30 wt.%, from 15 wt.% to 20 wt.%, from 15 wt.% to 25 wt.%, from 15 wt.% to 30 wt.%, from 20 wt.% to 25 wt.%, from 20 wt.% to 30 wt.%, or from 25 wt.% to 30 wt.% aromatization-promoting FCC additive based on the total weight of the FCC catalyst composition.

The FCC catalyst composition of the present disclosure can be in the form of shaped microparticles, such as microspheres. As described, "microparticles" refer to particles having a size of from 0.1 micrometers (μm or microns) to 100 μm. The size of the microparticles refers to the maximum length of a particle from one side to the opposite side, measured along the longest distance of the microparticle. For example, a spherically-shaped microparticle has a size equal to its diameter, while a rectangular prism-shaped microparticle has a maximum length equal to the hypotenuse stretching from opposite corners.

In embodiments, the FCC catalyst composition can be a blend of the aromatization-promoting FCC additive and the FCC catalyst comprising the USY zeolite. The catalyst microparticles can be mixed where each of the microparticles contains only a portion of the FCC catalyst composition. For example, a mixture of two microparticle types can be included in the FCC catalyst composition, where one type of microparticle includes the FCC catalyst comprising the USY zeolite and a different type of microparticle includes the aromatization—promoting FCC additive. In embodiments, the FCC catalyst composition can include a mixture of first catalyst microparticles and second catalyst microparticles, where the first catalyst microparticles can comprise the USY zeolite and the second catalyst microparticles can comprise the aromatization-promoting FCC additive. The FCC catalyst compositions can be prepared by mixing FCC catalyst microparticles and particles of the aromatization-promoting FCC additive to produce a catalyst blend.

In embodiments, the FCC catalyst composition can include a rare earth oxide having chemical formula of $RE_2O_3$ where RE is a rare earth metal. The rare earth metal of the rare earth metal oxide can be selected from one or more of cerium (Ce), lanthanum (La), praseodymium (Pr), neodymium (Nd), or combinations of these. The composition can comprise from 0.0 wt.% to 6.0 wt.% rare earth oxide based on the total weight of the FCC catalyst composition. The FCC catalyst composition can comprise from 0.0 wt.% to 0.5 wt.%, from 0.0 wt.% to 1.0 wt.%, from 0.0 wt.% to 1.5 wt.%, from 0.0 wt.% to 2.0 wt.%, from 0.0 wt.% to 2.5 wt.%, from 0.0 wt.% to 3.0 wt,%, from 0.0 wt.% to 4 wt.%, from 0.0 wt.% to 5 wt.%, from 0.5 wt.% to 1.0 wt.%, from 0.5 wt.% to 1.5 wt.%, from 0.5 wt.% to 2.0 wt.%, from 0.5 wt.% to 2.5 wt.%, from 0.5 wt.% to 3.0 wt.%, from 0.5 wt.% to 4.0 wt.%, from 0.5 wt.% to 5.0 wt.%, from 0.5 wt.% to 6.0 wt.%, from 1.0 wt.% to 1.5 wt.%, from 1.0 wt.% to 2.0 wt.%, from 1.0 wt.% to 2.5 wt.%, from 1.0 wt.% to 3.0 wt.%, from 1.0 wt.% to 4.0 wt.%, from 1.0 wt.% to 5.0 wt.%, from 1.0 wt.% to 6.0 wt.%, from 1.5 wt.% to 2.0 wt.%, from 1.5 wt.% to 2.5 wt.%, from 1.5 wt.% to 3.0 wt.%, from 1.5 wt.% to 4.0 wt.%, from 1.5 wt.% to 5.0 wt.%, from 1.5 wt.% to 6.0 wt.%, from 2.0 wt.% to 2.5 wt.%, from 2.0 wt.% to 3.0 wt.%, from 2.5 wt.% to 3.0 wt.%, from 2.0 wt.% to 4.0 wt.%, from 2.0 wt.% to 5.0 wt.%, from 2.0 wt.% to 6.0 wt.%, from 3.0 wt.% to 4.0 wt.%, from 3.0 wt.% to 5.0 wt.%, from 3.0 wt.% to 6.0 wt.%, from 4.0 wt.% to 5.0 wt.%, or from 4.0 wt.% to 6.0 wt.% rare earth oxide based on the total weight of the FCC catalyst composition.

The FCC catalyst compositions of the present disclosure can be incorporated into a reactor system for upgrading hydrocarbons through fluid catalytic cracking. The FCC reactor system can be an upflow or downflow fluidized catalytic cracking reactor. Referring to FIG. 1, one embodiment of a FCC reactor system 100 that includes a riser FCC reactor suitable for use with for the methods of upgrading a hydrocarbon feed of the present disclosure is schematically depicted. The operation of the FCC system and methods for upgrading a hydrocarbon feed are described in the present disclosure in the context of FCC reactor system 100 comprising the upflow FCC reactor 110. However, it should be understood that other reactor system configurations can be suitable for the methods described in the present disclosure, such as but not limited to the FCC reactor system 200 of FIG. 2, which includes a downflow FCC reactor.

Referring again to FIG. 1, the FCC reactor system 100 comprises an upflow FCC reactor 110 and a catalyst regeneration unit 120. As used in the present disclosure in the context of FIG. 1, the upflow FCC reactor 110 refers to the portion of the FCC reactor system 100 in which the major process reaction takes place, such as the upgrading of a hydrocarbon feed to form light olefins and gasoline constituents. The upflow FCC reactor 110 can include a riser 112, a reaction zone 114 downstream of the riser 112, and a separation zone 116 downstream of the reaction zone 114. The FCC reactor system 100 can also include a regeneration zone 122 in the regeneration unit 120 for regenerating spent catalyst.

In operation, the hydrocarbon feed 111 is introduced to the riser 112. Although not shown in FIG. 1, in embodiments, the hydrocarbon feed 111 can be combined with steam or other suitable gas for atomization of the hydrocarbon feed 111. The hydrocarbon feed 111 is combined with an effective quantity of heated fresh or regenerated catalyst particles in the riser 112. The heated fresh or regenerated catalyst particles comprises the FCC catalyst compositions of the present disclosure and may have any of the features, compositions, or properties previously described in the present disclosure for the FCC catalyst compositions. The heated fresh or regenerated catalyst particles can be conveyed via a conduit 123 from the regeneration zone 122 to the riser 112. The hydrocarbon feed 111 and the FCC catalyst composition are contacted in the riser 112 and passed upward through the riser 112 into the reaction zone 114. In the riser 112 and the reaction zone 114, the hydrocarbons from the hydrocarbon feed 111 are contacted with the FCC catalyst composition particles at reaction conditions. Contact of the hydrocarbons from the hydrocarbon feed 111 with the FCC catalyst composition particles at the reaction conditions causes at least a portion of the hydrocarbons to undergo one or more chemical reactions to form upgraded hydrocarbons, which can include gasoline components and light olefins such as but not limited to ethylene, propylene, mixed butenes, or combinations of these.

The reaction mixture comprising the spent FCC catalyst composition particles, reaction products, and unreacted hydrocarbons are passed to the separation zone 116 downstream of the reaction zone 114. In the separation zone 116, the reaction products and unreacted hydrocarbons are separated from the spent FCC catalyst composition particles using any suitable configuration known in the art. The reaction products, unreacted hydrocarbons, and other gases separated from the spend FCC catalyst composition particles can be withdrawn from the separation zone 116 via conduit 119. During the reaction, the FCC catalyst composition particles can become coked, and the coke deposits can reduce access to the active catalytic sites on the spent FCC catalyst composition particles. The spent FCC catalyst composition particles containing coke deposits from the reaction can be passed through conduit 115 to the regeneration zone 122 of the regenerator 120.

In the regeneration zone 122 of the regenerator 120, the coked FCC catalyst composition particles may come into contact with a stream of oxygen-containing gas, which may enter the regeneration zone 122 via conduit 121. Contact with the oxygen-containing gas causes the coke deposits to undergo combustion, which removes the coke deposits from and heats the FCC catalyst composition particles. The regeneration zone 122 may be operated as a fluidized bed to produce a regeneration off-gas comprising combustion products, which may be discharged via conduct 125. The hot regenerated FCC catalyst composition particles may be transferred from the regeneration zone 122 of the catalyst regeneration unit 120 via conduit 123 to the bottom portion of the riser 112 for admixture with the hydrocarbon feed 111.

Referring now to FIG. 2, another embodiment of an FCC reactor system 200 suitable for use with for the methods of upgrading a hydrocarbon feed described in the present disclosure is schematically depicted. The FCC reactor system 200 of FIG. 2 includes a downflow FCC reactor 210 and a catalyst regeneration unit 220. As used in the present disclosure in the context of FIG. 2, the downflow FCC reactor 210 generally refers to the unit of the reactor system 200 in which the major process reaction takes place, such as the upgrading of a hydrocarbon feed to form light olefins and gasoline constituents. The downflow FCC reactor 210 can include a reactor zone 212, a separation zone 214, and a stripper zone 216. As used in the context of FIG. 2, the reactor system 200 can also include a regeneration zone 222 in the regeneration unit 220 for regenerating the spent catalyst.

A hydrocarbon feed 211 can be introduced to the reaction zone 212 with steam or other suitable gas (not shown) for atomization of the feed. The heated fresh or regenerated FCC catalyst composition particles from regeneration zone 222 can be conveyed to the top of the reaction zone 212 through a downwardly directed conduit 268 to a withdrawal or hopper (not shown) at the top of the reaction zone 212. The flow of hot FCC catalyst composition particles can be allowed to stabilize in order to be uniformly directed into the mix zone or feed injection portion of the reaction zone 212. The hydrocarbon feed 211 can be injected into a mixing zone at the top of the reaction zone 212 through feed injection nozzles typically situated proximate to the point of introduction of the regenerated FCC catalyst composition particles into reaction zone 212. The multiple injection nozzles can cause the FCC catalyst composition particles and hydrocarbon feed 211 to mix thoroughly and uniformly. Once the hydrocarbon feed 211 contacts the hot FCC catalyst composition particles, a catalytic reaction may begin.

The hydrocarbon feed 211 and FCC catalyst composition particles travel downwards through the reaction zone 212. At the end of the reaction zone 212, the reaction vapors (reaction products, unconverted hydrocarbon feed, and carrier gases) and spent FCC catalyst composition particles pass into the separation zone 214 downstream of the reaction zone 212. In the separation zone 214, the spent FCC catalyst composition particles are separated from the reaction vapors, which include reaction products and unreacted hydrocarbons from the hydrocarbon feed 211. The reaction vapors can be directed through conduit 219 to various product recovery unit operations. The reaction temperature (which may be equivalent to the outlet temperature of the FCC unit 210) can be controlled by opening and closing a catalyst slide valve (not shown) that controls the flow of regenerated FCC catalyst composition particles from the regeneration zone 222 into the top of the reaction zone 212.

The spent FCC catalyst composition particles can be passed from the separation zone 214 to the stripper zone 216. In the stripper zone 216, a suitable stripping gas, such as steam, can be introduced through streamline 213. The stripping zone 216 can comprise a plurality of baffles or structured packing (not shown) over which downwardly flowing catalyst particles passes counter-currently relative to the stripping gas. The upwardly flowing stripping gas can strip or remove any additional hydrocarbons, such as reaction products or unreacted hydrocarbons from the feed, that remain in the pores of the spent FCC catalyst composition particles or between the FCC catalyst compositions particles.

The spent FCC catalyst composition particles can be passed from the stripper zone 216 via conduit 215 to the catalyst regeneration unit 220. The spent FCC catalyst composition particles can be transported by lift forces from a combustion air stream 221 through a lift riser of the catalyst regeneration unit 220. The spent FCC catalyst composition particles can then be contacted with additional combustion air and subjected to controlled combustion in the regeneration zone 222 to remove coke deposits and heat the FCC catalyst composition particles to produce regenerated FCC catalyst composition particles. Flue gasses may be removed from the regeneration zone 222 via conduit 225. In the regenerator, the heat produced from the combustion of any coke by-product can be transferred to the FCC catalyst composition particles, which increases the temperature of the FCC catalyst composition to provide the heat required by the catalytic reactions in the reaction zone 212.

A method for upgrading a hydrocarbon feed can include contacting the hydrocarbon feed with the FCC catalyst composition of the present disclosure in a fluidized catalytic cracking reactor at reaction conditions sufficient to upgrade at least a portion of the hydrocarbon feed, where the FCC catalyst composition comprises the FCC catalyst and the aromatization-promoting FCC additive. The FCC catalyst can include a USY zeolite. The aromatization-promoting FCC additive comprises an MFI zeolite modified by an aromatization compound, where the aromatization compound comprises a metal or metal oxide comprising one or more metal elements in periods 4-6 of the IUPAC periodic table. The FCC catalyst composition can have any of the features, compositions, or properties described herein for the FCC catalyst composition. The fluidized catalytic cracking reactor can be an upflow or downflow FCC reactor as shown in the FCC reactor system 100 of FIG. 1 or in the FCC reactor system 200 of FIG. 2, and can have any of the features described in the present disclosure for these reactor system.

The hydrocarbon feed can include one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, hydrocracker bottoms, unconverted hydrocracker bottoms, or combinations of these. In embodiments, the hydrocarbon feed can be a hydrocarbon stream derived from one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, hydrocracker bottoms, unconverted hydrocracker bottoms, or combinations of these. The hydrocarbon feed can have an atmospheric boiling point range greater than or equal to 350° C. As used throughout the present disclosure, "atmospheric boiling point range" may refer to the temperature interval from the initial boiling point to a final boiling point at atmospheric pressure, where initial boiling point refers to the temperature at which the first drop of distillation product is obtained and final boiling point refers to the temperature at which the highest-boiling point compounds evaporate, at atmospheric pressure.

In embodiments, the hydrocarbon feed can be a heavy oil selected from the group consisting of crude oil, hydrocracker bottoms, coker gas oil, deasphalted oil, and combinations of these. In embodiments, the hydrocarbon feed can comprise a hydrocracking recycle stream or hydrocracker bottoms stream from a hydrocracking unit, which can include a high concentration of unconverted hydrocarbons. The hydro cracker bottoms stream having the following properties shown in Table 1 can be suitable for the hydrocarbon stream, in embodiments.

TABLE 1

| Composition of a Hydrocracker Bottoms Stream | | |
|---|---|---|
| Property | Unit | Value |
| Density (at 15° C.) | g/mL | 0.8419 |
| Micro Carbon Residue (MCR) | wt. % | 0.02 |
| Nitrogen | ppm | <5 |
| Sulfur | ppm | 50 |
| Aromatics | wt. % | 0.47 |
| Hydrogen | wt. % | 13.77 |

The hydrocarbon feed can be contacted with the FCC catalyst composition at a temperature from 450° C. to 700° C. The hydrocarbon feed can be contacted with the FCC catalyst composition at a temperature from 450° C. to 500° C., from 450° C. to 550° C., from 450° C. to 650° C., from 500° C. to 550° C., from 500° C. to 600° C., from 500° C. to 650° C., from 500° C. to 700° C., from 550° C. to 600° C., from 550° C. to 650° C., from 550° C. to 700° C., from 600° C. to 650° C., from 600° C. to 700° C., or from 650° C. to 700° C. In embodiments, the hydrocarbon feed can be contacted with the FCC catalyst composition at a temperature of from 500° C. to 550° C., such as at a temperature of about 520° C.

The hydrocarbon feed can be contacted with the FCC catalyst composition at a pressure from 0.1 megapascals (MPa) to 1 MPa. The hydrocarbon feed can be contacted with the FCC catalyst composition at a pressure from 0.1 MPa to 0.2 MPa, from 0.1 MPa to 0.3 MPa, from 0.1 MPa to 0.4 MPa, from 0.1 MPa to 0.5 MPa, from 0.1 MPa to 0.6 MPa, from 0.1 MPa to 0.7 MPa, from 0.1 MPa to 0.8 MPa, from 0.1 MPa to 0.9 MPa, from 0.3 MPa to 0.4 MPa, from 0.3 MPa to 0.5 MPa, from 0.3 MPa to 0.6 MPa, from 0.3 MPa to 0.7 MPa, from 0.3 MPa to 0.8 MPa, from 0.3 MPa to 0.9 MPa, from 0.3 MPa to 1.0 MPa, from 0.5 MPa to 0.6 MPa, from 0.5 MPa to 0.7 MPa, from 0.5 MPa to 0.8 MPa., from 0.5 MPa to 0.9 MPa., or from 0.5 MPa to 1.0 MPa.

The hydrocarbon feed can be contacted with the FCC catalyst composition at the reaction temperature for a contact time (the total time that the hydrocarbon feed spends in contact with the FCC catalyst composition at the reaction temperature) of from 0.1 seconds to 60 seconds (s). The hydrocarbon feed can be contacted with the FCC catalyst composition at the reaction temperature for a contact time from 0.1 s to 10 s, from 0.1 s to 20 s, from 0.1 s to 30 s, from 0.1 s to 40 s, from 0.1 s to 50 s, from 10 s to 20 s, from 10 s to 30 s, from 10 s to 40 s, from 10 s to 50 s, from 10 s to 60 s, from 20 s to 30 s, from 20 s to 40 s, from 20 s to 50 s, from 20 s to 60 s, from 30 s to 40 s, from 30 s to 50 s, from 30 s to 60 s, from 40 s to 50 s, from 40 s to 60 s, or from 50 s to 60 s.

The hydrocarbon feed can be contacted with the FCC catalyst composition at a mass ratio of FCC catalyst composition to hydrocarbon feed of from 1 to 30. For example, the hydrocarbon feed may be contacted with the FCC catalyst composition at a mass ratio of FCC catalyst composition to hydrocarbon feed of from 1 to 20, from 1 to 15, from 1 to 10, from 2 to 30, from 2 to 20, from 2 to 15, from 2 to 10, from 8 to 30, or from 8 to 20.

The cracked effluent, as compared to the hydrocarbon feed, can comprise increased concentrations of one or more of gasoline, light cycle oil (LCO), heavy cycle oil (HCO), total gas ($C_4$ and lighter), dry gas ($C_2$ and lighter), liquefied petroleum gas ($C_3$-$C_4$), ethylene, propylene, and butenes. The cracked effluent can have a greater concentration of gasoline components compared a cracked effluent subjected to fluidized catalytic cracking using a catalyst composition comprising a USY zeolite and a commercial cracking additive without the aromatization compound.

As previously discussed, the aromatization-promoting FCC additive comprises an MFI zeolite modified by an aromatization compound, where the aromatization compound comprises a metal or metal oxide comprising one or more metal elements in periods 4-6 of the IUPAC periodic table. The FCC catalyst composition can comprise from 1 wt.% to 30 wt.% aromatization-promoting FCC additive based on the total weight of the FCC catalyst composition. In embodiments, the MFI zeolite can be ZSM-5 zeolite. In embodiments, the MFI zeolite can be a hydrogen form ZSM-5 zeolite. In embodiments, the one or more metal elements of the aromatization compound can be selected from the group consisting of gallium (Ga), zinc (Zn), chromium (Cr), manganese (Mn), platinum (Pt), iron (Fe), molybdenum (Mo), lanthanum (La), cerium (Ce), and combinations thereof. In embodiments, the aromatization compound can comprise gallium metal or gallium oxide. The aromatization-promoting FCC additive can comprise from 0.1 weight percent to 10 weight percent aromatization compound based on the total weight of the aromatization-promoting FCC additive.

The FCC catalyst composition can further include from 15 wt.% to 60 wt.% non-zeolitic inorganic materials on the total weight of the FCC catalyst composition. The non-zeolitic inorganic materials can include one or more of silica sol, basic aluminum chloride, aluminum biphosphate, alumina sol, activated alumina, porous silica, a rare earth oxide, a non-zeolitic metal trapping agent, or combinations of these. In embodiments, the FCC catalyst composition can include one or more matrix materials, such as but not limited to Kaolin clay or other clay materials. In embodiments, the FCC catalyst composition can further include a rare earth oxide having chemical formula of $RE_2O_3$ and include from 0 wt.% to 6.0 wt.% rare earth oxide based on the total weight of the FCC catalyst composition. In embodiments, the rare earth metal of the rare earth oxide can include one or more of cerium, lanthanum, praseodymium, neodymium, or combinations of these. The FCC catalyst composition can have any other features, compositions, or properties previously described in the present disclosure for the FCC catalyst composition.

EXAMPLES

The various embodiments of FCC catalyst compositions and methods for upgrading hydrocarbons will be further clarified by the following examples. The examples are illustrative in nature, and should not be understood to limit the subject matter of the present disclosure.

Example 1: FCC Catalyst Blend Comprising USY Zeolite FCC Catalyst and the Aromatization-Promoting FCC Additive.

For Example 1, the catalyst blend comprised the FCC catalyst, which contained USY zeolite, and the aromatization-promoting FCC additive. The same FCC catalyst, which contained USY zeolite, was used for Example 1 and Comparative Examples 2 and 3. The aromatization-promoting FCC additive of Example 1 comprised ZSM-5 zeolite modified with gallium oxide as the aromatization compound, which is referred to in these Examples as Ga-ZSM-5. The ZSM-5 zeolite component of the Ga-ZSM-5 was Z-30 ZSM-5 zeolite obtained from Zeolyst International, which had a silica to alumina mole ratio of 30. The Ga-ZSM-5 of Example 1 comprised 2 wt.% gallium oxide impregnated onto the Z-30 ZSM-5 zeolite. The catalyst blend of Example 1 comprised first FCC catalyst particles, which contained the USY zeolite, and second particles comprising the Ga-ZSM-5. The catalyst blend of Example 1 included 87.5 wt.% FCC catalyst, which contained USY zeolite, and 12.5 wt.% Ga-ZSM-5. The catalyst blend of Example 1 was prepared by combining the first FCC catalyst particles and the second particles comprising the Ga-ZSM-5 and mixing to produce a homogeneous blend.

Comparative Example 2: Catalyst Blend Comprising USY Zeolite FCC Catalyst and a Commercial Cracking Additive.

The catalyst blend of Comparative Example 2 comprised the FCC catalyst, which contained the USY zeolite, and a commercial cracking additive. The FCC catalyst, which contained USY zeolite, was the same as the USY zeolite FCC catalyst in the FCC catalyst blend of Example 1. The commercial cracking additive was MFI zeolite based OCTUP-α™ additive available from JGC Catalyst and Chemical Ltd, which was designed to enhance olefin production. The catalyst blend of Comparative Example 2 comprised first FCC catalyst particles, which contained the USY zeolite, and second particles comprising the OCTUP-α™ additive. The catalyst blend of Comparative Example 2 included 87.5 wt.% USY zeolite FCC catalyst and 12.5 wt.% OCTUP-α™ additive. The catalyst blend of Comparative Example 2 was prepared by combining the first FCC catalyst particles comprising the USY zeolite and the second particles comprising the OCTUP-α™ additive and mixing to produce a homogeneous blend.

Comparative Example 3: Catalyst Blend Comprising USY Zeolite FCC Catalyst and a Pristine ZSM-5 (without metal promotion).

The catalyst blend of Comparative Example 3 comprised the FCC catalyst, which included the USY zeolite, and pristine ZSM-5. The FCC catalyst comprising the USY zeolite was the same as the FCC catalyst in the catalyst blend of Example 1 and the catalyst blend of Comparative Example 2. Pristine ZSM-5 refers to ZSM-5 that was not modified by gallium or any other metal impregnated onto the surfaces of the ZSM-5. The pristine ZSM-5 of Comparative Example 3 was Z-30 ZSM-5 zeolite obtained from Zeolyst International, which had a silica to alumina mole ratio of 30. The pristine ZSM-5 for Comparative Example 3 did not have gallium oxide or any other aromatization promoting metal or metal oxide deposited on the ZSM-5 zeolite. The catalyst blend of Comparative Example 3 comprised first FCC catalyst particles comprising the USY zeolite and second particles comprising the pristine ZSM-5. The catalyst composition of Comparative Example 3 included 87.5 wt.% USY zeolite FCC catalyst and 12.5 wt.% pristine ZSM-5, which were the same weight percentages as the catalyst blend of Example 1 and the catalyst blend of Comparative Example 2. The catalyst blend of Comparative Example 3 was prepared by combining the first FCC catalyst particles comprising the USY zeolite and the second particles comprising the pristine ZSM-5 and mixing to produce a homogeneous blend.

Example 4: Testing

In Example 4, the performance of the FCC catalyst blend of the Example 1 for cracking a heavy hydrocarbon feed was compared to the performance of the comparative catalyst blends of Comparative Examples 2 and 3 for cracking the same heavy hydrocarbon feed. The catalyst blends were tested using a fixed-bed micro-activity cracking testing (MAT) unit. The activity of each of the FCC catalyst blends was determined according to ASTM standard method D5154 entitled "Determining Activity and Selectivity of Fluid Catalytic Cracking (FCC) Catalysts by Microactivity Test". The hydrocarbon feed was a hydrocracking unconverted bottoms stream (HCB), which was sampled from a two-stage hydrocracking unit. The properties of the hydrocarbon feed are shown in Table 1, previously presented. As shown in Table 1, the hydrocarbon feed had a very low concentration of aromatic compounds (aromatics), which indicates that the hydrocarbon feed was mostly paraffinic and naphthenic and contained very low concentrations of sulfur and nitrogen.

The catalyst blends of Example 1 and Comparative Examples 2 and 3 were each conditioned according to ASTM standard guide D4463, entitled "Guide for Metals Free Steam Deactivation of Fresh Fluid Cracking Catalysts." Each catalyst blend was first calcined at 500° C. for four hours. Then, the temperature was increased at the rate of 3.6° C. per minute to 810° C. After 30 minutes, water was fed to the preheating zone of the steamer at a rate of 3 ml per minute. While flowing steam at ambient pressure, the temperature was maintained at 810° C. for six hours.

The weight of catalyst blend, reaction temperature, and weight hour space velocity of the hydrocarbon feed were maintained constant for each of the catalyst blends of Example 1 and Comparative Examples 2 and 3. For each test, 5.0 grams of the catalyst blend were transferred to the reactor. The catalysts were then heated to a reaction temperature of 520° C. with nitrogen gas flowing through the catalyst bed. When the catalyst bed temperature was within ±1° C. of the reaction temperature of 520° C., the hydrocarbon feed was injected. The injection rate was set at 2 grams per minute, while the injection time was controlled from 30 to 60 seconds. The tests were carried out at 520° C., with a catalyst to hydrocarbon feed weight ratio of from 3 to 6.

The entire gaseous product was passed through a liquid receiver, where $C_{5+}$ hydrocarbons were condensed and non-condensable products were collected in a glass burette by water displacement. The volume of the gas collected in the burette was noted and the gas sample was transferred into a gas sampling bag. Coke on the spent catalyst was determined after each reaction by using a Horiba carbon analyzer.

An Agilent Micro GC with four TCD detectors was used to analyze the hydrocarbon gas products. The gas from the start of the feed injection to the liquid stripping was collected in the glass bottle by water displacement. All the components in the gas product stream including nitrogen, hydrogen, all $C_{1-4}$ hydrocarbons, and some $C_5$ and $C_6$ hydrocarbons were analyzed. $C_5$ and heavier yields were added to the gasoline product during the data processing.

For the liquid product, simulated distillation was carried out using a Shimadzu 2010 GC equipped with an FID detector according to ASTM D-2887. Three different liquid cuts were considered: gasoline ($C_5$—less than 221° C.), light cycle oil (LCO—from 221° C. to 343° C.), and heavy cycle oil (HCO—greater than 343° C.). The weight percentage of liquid products were used to calculate conversion and yields.

Figure 3:
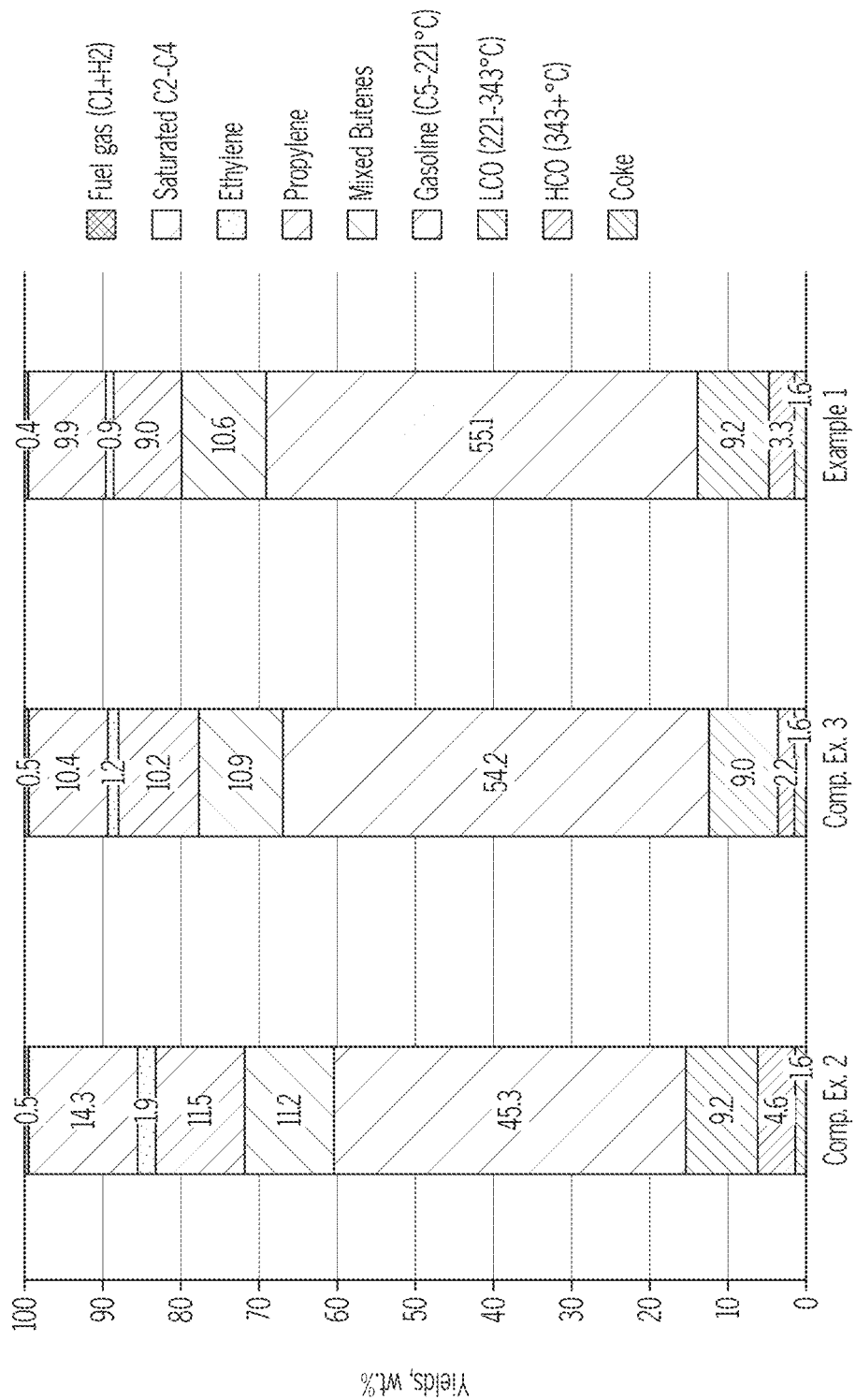
FIG. 3 graphically depicts product yields from fluidized catalytic cracking of a hydrocracker unconverted bottom stream using the FCC catalyst composition of Example 1 and the catalyst compositions of Comparative Examples 2 and 3, according to one or more embodiments shown and described in this disclosure.

The results obtained from the MAT testing unit for Example 4 using catalyst blends with 12.5 wt.% Ga-ZSM-5 for Example 1 and Comparative Examples 2 and 3 are depicted graphically in FIG. 3 and provided in Table 2. FIG. 3 compares the yield profile at iso-coke yield of 1.6 wt.% for the FCC catalyst composition of Example 1 compared to the yield profiles obtained for the catalyst compositions of Comparative Examples 2 and 3, having the OCTUP-α™ additive and the pristine ZSM-5, respectively. To determine the yield profiles at iso-coke yield of 1.6 wt.%, a plurality of test runs at different catalyst to oil ratios were conducted for the comparative catalyst blends of Example 1 and Comparative Examples 2 and 3. For each catalyst, the products yield for each product was plotted against the coke yield. The product yield as a function of coke yield for each catalyst was then interpolated to the same value of the coke yield of 1.6 wt.%, so that a direct comparison could be made.

The conversion was calculated as the sum of the mass percent of gas products plus coke and plus the gasoline fractions divided by the total mass of hydrocarbon feed. The gasoline fraction or gasoline constituents refer to constituents of the cracking effluent having an atmospheric boiling point temperature of from $C_5$-221° C. The boiling point of normal pentane (n-$C_5$) is about 36° C. The products yields are defined as the weight of the product component, on mass basis, divided by the total weight of all the products, which include gas, liquid, and solid products.

TABLE 2

Product Yields for Example 4 in Weight Percent for Iso-Coke Yield of 1.6 wt. %.

| Additive | Example 1 Ga-ZSM-5 | Comp. Ex. 2 OCTUP-α ™ additive | Comp. Ex. 3 Pristine-ZSM-5 |
|---|---|---|---|
| Fuel Gas ($C_1$ + $H_2$) | 0.4 | 0.5 | 0.5 |
| Saturated $C_2$-$C_4$ | 9.9 | 14.3 | 10.4 |
| Ethylene | 0.9 | 1.9 | 1.2 |
| Propylene | 9.0 | 11.5 | 10.2 |
| Mixed Butenes | 10.6 | 11.2 | 10.9 |
| Gasoline (C5-221° C.) | 55.1 | 45.3 | 54.2 |
| Light Cycle Oil (LCO – 221-343° C.) | 9.2 | 9.2 | 9.0 |
| Heavy Cycle Oil (HCO – 343+° C.) | 3.3 | 4.6 | 2.2 |
| Coke | 1.6 | 1.6 | 1.6 |

As shown in FIG. 3 and Table 2, the FCC catalyst blend of Example 1 comprising the Ga-ZSM-5 additive resulted in a significant increase in yield of gasoline constituents (boiling point range $C_{5+}$-221° C.) compared to the catalyst blends of Comparative Examples 2 and 3, having the OCTUP-α™ additive and pristine-ZSM-5, respectively. The FCC catalyst blend of Example 1 with the Ga-ZSM-5 additive further led to a decrease in yield of light gases compared to the catalyst blends of Comparative Examples 2 and 3, where the light gases includes hydrogen and $C_1$-$C_4$ hydrocarbons. In particular, the FCC catalyst blend of Example 1 resulted in a significant decrease in the yield of saturated $C_2$-$C_4$ hydrocarbons compared to the catalyst blends of Comparative Examples 2 and 3. The FCC catalyst blend of Example 1 showed a slight decrease in yield of $C_2$-$C_4$ olefins (~5% decrease) compared to the catalyst blends of Comparative Examples 2 and 3, but the yield of $C_2$-$C_4$ olefins was still comparable to the yield of $C_2$-$C_4$ olefins obtained from the catalyst blends of Comparative Examples 2 and 3.

Table 3 illustrates the delta yields of the catalyst blends of Example 1 (Ga-ZSM-5 additive) and Comparative Example 3 (pristine ZSM-5) at iso-coke yield of 1.6 wt.% level as compared to the catalyst blend of Comparative Example 2 (OCTUP-α™ additive). The delta yield refers to the change in the yield for a constituent. A positive value for the delta yield indicates an increase in the yield of a particular constituent of the effluent due to presence of the aromatization-promoting FCC additive or cracking additive, while negative number for the delta yield indicates a decrease in the yield of that particular constituent. In Table 3, the delta yield is the change in yield compared to the yield obtained using the comparative catalyst blend of Comparative Example 2, which included the OCTUP-α™ additive. In Table 3, the dry gases refer to the combination of hydrogen, methane ($C_1$) and saturated $C_2$-$C_4$ hydrocarbons (ethane, propane, butanes).

TABLE 3

Delta Yields obtained for the FCC Catalyst Composition of Example 1 and the Catalyst Composition of Comparative Example 3.

| Product | Example 1 Ga-ZSM-5 Change (wt. %) | Comp. Ex. 3 Pristine ZSM-5 Change (wt. %) |
|---|---|---|
| Gasoline | 9.8 | 9.0 |
| LCD | −0.1 | −0.2 |
| HCO | −1.3 | −2.4 |
| Fuel gas ($C_1$ and $H_2$) | 0 | 0 |
| Saturated ($C_2$-$C_4$) | −4.4 | −3.9 |
| Ethylene | −1.0 | −0.7 |
| Propylene | −2.5 | −1.3 |
| Total Mixed Butenes | −0.6 | −0.3 |
| Total Conversion | 1.3 | 2.7 |

As shown in Table 3, the Ga-ZSM-5 additive (e.g., aromatization-promoting FCC additive) included in the FCC catalyst blend of Example 1 produced increased gasoline yield and decreased dry gases yield, with minimal changes in the yields of propylene, mixed butenes, and liquid products (LCO and HCO) compared to the catalyst blend of Comparative Example 3. The FCC catalyst blend of Example 1 produced an increase in gasoline yield of nearly 10% compared to the comparative catalyst blend of Comparative Example 2. Thus, the aromatization-promoting FCC additive comprising Ga-ZSM-5 increased the yield of gasoline components (aromatic compounds) while maintaining a balance between the yield of olefins and gasoline components.

A first aspect of the present disclosure may include a fluid catalytic cracking (FCC) catalyst composition comprising an FCC catalyst and from 1 wt.% to 30 wt.% aromatization-promoting FCC additive based on the total weight of the FCC catalyst composition. The aromatization-promoting FCC additive may comprise an MFI zeolite modified by an aromatization compound. The aromatization compound may comprise a metal or metal oxide comprising one or more metal elements from periods 4-6 of the IUPAC periodic table.

A second aspect of the present disclosure may include the first aspect, where the FCC catalyst is an ultra-stable Y zeolite (USY zeolite).

A third aspect of the present disclosure may include either one of the first or second aspects, where the USY zeolite may comprise a crystal lattice constant from 2.430 nanometers to 2.450 nanometers and a specific surface area from 600 square meters per gram to 900 square meters per gram.

A fourth aspect of the present disclosure may include any one of the first through third aspects, where the FCC catalyst composition may comprise from 5 weight percent to 70 weight percent USY zeolite based on the total weight of the FCC catalyst composition.

A fifth aspect of the present disclosure may include any one of the first through fourth aspects, where the MFI zeolite may comprise a ZSM-5 zeolite.

A sixth aspect of the present disclosure may include any one of the first through fifth aspects, where the MFI zeolite may comprise a molar ratio of silica to alumina of from 5:1 to 100:1.

A seventh aspect of the present disclosure may include any one of the first through sixth aspects, where the one or more metal elements of the aromatization compound may be selected from the group consisting of gallium (Ga), zinc (Zn), chromium (Cr), manganese (Mn), platinum (Pt), iron (Fe), molybdenum (Mo), lanthanum (La), cerium (Ce), and combinations thereof.

An eighth aspect of the present disclosure may include any one of the first through seventh aspects, where the aromatization compound may comprise gallium metal or gallium oxide.

A ninth aspect of the present disclosure may include any one of the first through eighth aspects, where the aromatization-promoting FCC additive may comprise from 0.1 weight percent to 10 weight percent aromatization compound based on the total weight of the aromatization-promoting FCC additive.

A tenth aspect of the present disclosure may include any one of the first through ninth aspects, where the aromatization compound is impregnated onto the MFI zeolite of the aromatization-promoting FCC additive.

An eleventh aspect of the present disclosure may include any one of the first through tenth aspects, further comprising from 15 weight percent to 60 weight percent non-zeolitic inorganic materials based on the total weight of the FCC catalyst composition.

A twelfth aspect of the present disclosure may include any one of the first through eleventh aspects, further comprising one or more matrix materials.

A thirteenth aspect of the present disclosure may include any one of the first through twelfth aspects and may be directed to a method for upgrading a hydrocarbon feed. The method may comprise contacting the hydrocarbon feed with the FCC catalyst composition of any one of the first through twelfth aspects in a fluidized catalytic cracking reactor at reaction conditions to upgrade at least a portion of the hydrocarbon feed to produce gasoline and light olefins.

A fourteenth aspect of the present disclosure may include the thirteenth aspect, comprising contacting the hydrocarbon feed with the FCC catalyst composition at a reaction temperature of from 450 degrees Celsius to 700 degrees Celsius and a pressure of from 100 kilopascals to 1,000 kilopascals.

A fifteenth aspect of the present disclosure may include either one of the thirteenth or fourteenth aspects, comprising contacting the hydrocarbon feed with the FCC catalyst composition at mass ratio of catalyst to oil of from 1:2 to 1:30.

A sixteenth aspect of the present disclosure may include any one of the thirteenth through fifteenth aspects, comprising contacting the hydrocarbon feed with the FCC catalyst composition for a contact time of from 0.1 seconds to 60 seconds.

A seventeenth aspect of the present disclosure may include any one of the thirteenth through sixteenth aspects, where the fluidized catalyst cracking reactor may comprise a downer reactor or a riser reactor.

An eighteenth aspect of the present disclosure may include any one of the thirteenth through seventeenth aspects, where the hydrocarbon feed may have an atmospheric boiling point range greater than or equal to 350° C.

A nineteenth aspect of the present disclosure may include any one of the thirteenth through eighteenth aspects, where the hydrocarbon feed may have an initial boiling point of greater than or equal to 350° C.

A twentieth aspect of the present disclosure may include any one of the thirteenth through nineteenth aspects, where the hydrocarbon feed may be a heavy oil selected from the group consisting of crude oil, hydrocracker bottoms, coker gas oil, deasphalted oil, and combinations of these.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for upgrading a hydrocarbon feed, the method comprising contacting the hydrocarbon feed with a fluidized catalytic cracking (FCC) catalyst composition in a fluidized catalytic cracking reactor at reaction conditions to upgrade at least a portion of the hydrocarbon feed to produce gasoline and light olefins, where the FCC catalyst composition comprises:
    an FCC catalyst; and
    from 1 wt.% to 30 wt.% aromatization-promoting FCC additive based on the total weight of the FCC catalyst composition, the aromatization-promoting FCC additive comprising an MFI zeolite modified by an aromatization compound, where the aromatization compound comprises gallium oxide.

2. The method of claim 1, where the FCC catalyst comprises an ultra-stable Y zeolite (USY zeolite).

3. The method of claim 2, where the USY zeolite comprises a crystal lattice constant from 2.430 nanometers to 2.450 nanometers and a specific surface area from 600 square meters per gram to 900 square meters per gram.

4. The method of claim 2, where the FCC catalyst composition comprises from 5 weight percent to 70 weight percent USY zeolite based on the total weight of the FCC catalyst composition.

5. The method of claim 1, where the MFI zeolite comprises a ZSM-5 zeolite.

6. The method of claim 1, where the MFI zeolite comprises a molar ratio of silica to alumina of from 5:1 to 100:1.

7. The method of claim 1, where the aromatization-promoting FCC additive comprises from 0.1 weight percent to 10 weight percent aromatization compound based on the total weight of the aromatization-promoting FCC additive.

8. The method of claim 1, where the aromatization compound is impregnated onto the MFI zeolite of the aromatization-promoting FCC additive.

9. The method of claim 1, further comprising from 15 weight percent to 60 weight percent non-zeolitic inorganic materials based on the total weight of the FCC catalyst composition.

10. The method of claim 1, further comprising one or more matrix materials.

11. The method of claim 1, comprising contacting the hydrocarbon feed with the FCC catalyst composition at a reaction temperature of from 450 degrees Celsius to 700 degrees Celsius and a pressure of from 100 kilopascals to 1,000 kilopascals.

12. The method of claim 1, comprising contacting the hydrocarbon feed with the FCC catalyst composition at mass ratio of catalyst to oil of from 1:2 to 1:30.

13. The method of claim 1, comprising contacting the hydrocarbon feed with the FCC catalyst composition for a contact time of from 0.1 seconds to 60 seconds.

14. The method of claim 1, where the fluidized catalyst cracking reactor comprises a downer reactor or a riser reactor.

15. The method of claim 1, where the hydrocarbon feed has an atmospheric boiling point range greater than or equal to 350° C.

16. The method of claim 1, where the hydrocarbon feed has an initial boiling point of greater than or equal to 350° C.

17. The method of claim 1, where the hydrocarbon feed is a heavy oil selected from the group consisting of crude oil, hydrocracker bottoms, coker gas oil, deasphalted oil, and combinations of these.

18. The method of claim 1, wherein the FCC catalyst composition comprises 2 wt.% gallium oxide based on the total weight of the FCC catalyst composition.

* * * * *